L. WIRTZ.
CHAIN.
APPLICATION FILED FEB. 19, 1918.

1,306,936.

Patented June 17, 1919.
2 SHEETS—SHEET 1.

L. WIRTZ.
CHAIN.
APPLICATION FILED FEB. 19, 1918.

1,306,936.

Patented June 17, 1919.
2 SHEETS—SHEET 2.

UNITED STATES PATENT OFFICE.

LUIS WIRTZ, OF EDGBASTON, BIRMINGHAM, ENGLAND.

CHAIN.

1,306,936.  Specification of Letters Patent.  Patented June 17, 1919.

Application filed February 19, 1918. Serial No. 218,074.

*To all whom it may concern:*

Be it known that I, LUIS WIRTZ, subject of the King of Great Britain, and residing at Richmond House, Poplar avenue, Edgbaston, Birmingham, Warwickshire, England, have invented new and useful Improvements in Chains, of which the following is a specification.

This invention comprises improvements in chains and refers to the type in which the various links are connected by universal joints in a manner permitting them to twist or rotate relatively to each other. Such chains are known in which alternate links are shank-like members with ball or equivalent ends provided with bearing surfaces and these connect tubular or other links carrying recesses or bearings at the ends in which the bulb ends of the shank links are received.

The first object of my present invention is to construct each link carrying the bearings for the shank links so that it is of itself of a jointed link character permitting free movement in at least two directions, in addition to the universal movement permitted by the two adjoining shank links.

A further important feature is the manner of constructing the elements of these links to inclose the bearing cup parts without necessitating the operation of riveting or the use of rivets, screws or the like in assembling the links. A constructional form of the invention in which the jointed bearing link is inclosed in a helical spring, also forms a feature of the invention.

On the drawings:—

In these illustrations $a$ is the solid connecting link with ball like ends $b$, $c$, represents the cup members which are fitted with liners $d$ and embrace the ball ends of the links $a$; $e$ represents the bridge connecting pieces which connect the ends or ears of the cup members $c$ and impart flexibility to the compound link.

Figure 6:
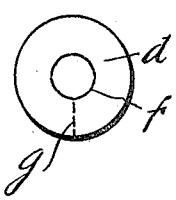
Fig. 6 is a plan of a liner blank.
Figure 7:
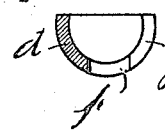
Fig. 7 is a section thereof after pressing and punching.
Figure 8:
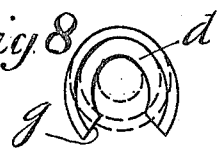
Fig. 8 is an inside plan of the liner open for inserting the shank of a solid link.

In one form of the invention as shown, I form liners or bearing members $d$, which if desired may be of softer or non-corrosive material, in one piece from a blank Fig. 6 which is pressed and punched with a central aperture $f$ and a slit $g$ extending from the periphery to the aperture $f$. This liner is opened at the slit $g$ as at Fig. 8 to allow it to be passed over the shank behind the ball head $b$ of same when it is closed again. The liners $d$ are received in the cup members $c$ which are preferably stamped flat, as at Fig. 5 with a circular disk and two opposite ears or extensions $h$ which are slotted longitudinally as at $j$. The disk is cupped to approximately hemispherical form and this brings the ears approximately parallel with each other. The cup $c$ is centrally punched or pierced with an aperture $k$ to pass the ball head $b$ of the shank $a$ and the latter may be passed through the cupped disk until the bearing liner $d$ can be engaged behind its head when the shank is drawn back with the liner in the cupped disk. Two cupped disks $c$ of the above form are employed and they are disposed with the lugs $h$ toward each other but preferably disposed in planes at right angles to each other, in the manner of a universal joint. In this condition they may be connected in any suitable manner as by wires or staples through the slots of opposite lugs engaged by a surrounding anchoring wire permitting universal movement to take place, but I prefer to separate them and employ between them two yoke members or bridge pieces $e$ with outwardly directed projections $l$ for engaging the slots $j$ in the lugs of the cupped members.

Figures 4, 5:
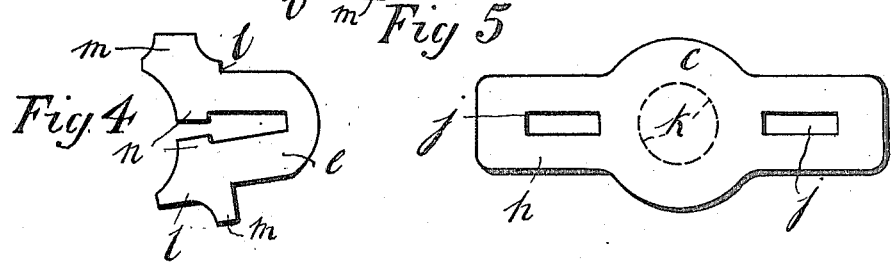
Fig. 4 is an elevation of one of the bridge pieces.
Fig. 5 is a plan of a cup blank.

The connecting yokes or bridge pieces $l$ may be stamped or pressed from sheet metal, and in the preferred form, are as at Fig. 4. In this form in addition to the projections $l$ to engage the slots of the cup members $c$ they have further external projections $m$ shaped approximately as shown for a purpose hereinafter set forth, and they also have internal projections $n$ which may be closed to meet when the parts are assembled and thus form a supporting or stiffening bridge, for the otherwise open end of the yoke members $e$.

Figure 3:
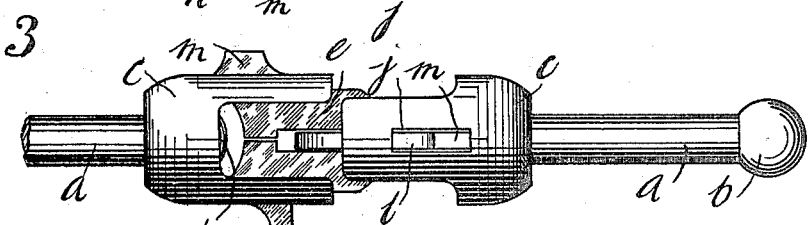
Fig. 3 is an elevation of the link mechanism without the covering spring.

Two members $e$ are connected across each other, as shown at Fig. 3 with their concave parts adjacent, but in planes at right angles to each other. After being connected they are closed until their projections $n$ meet, that is if they are of the preferred form, shown at Fig. 4. The projections $l$ at the ends of one member or bridge piece $e$ are engaged in the slots $j$ of the adjacent cup member $c$ and the projections $l$ of the other member or bridge piece are similarly engaged with the slots of the other cup member, and in this way a link is built up embracing the ends of two shank links $a$ and possessing considerable flexibility in addition to the flexibility and twisting properties of the ball shank link connection.

Figure 1:
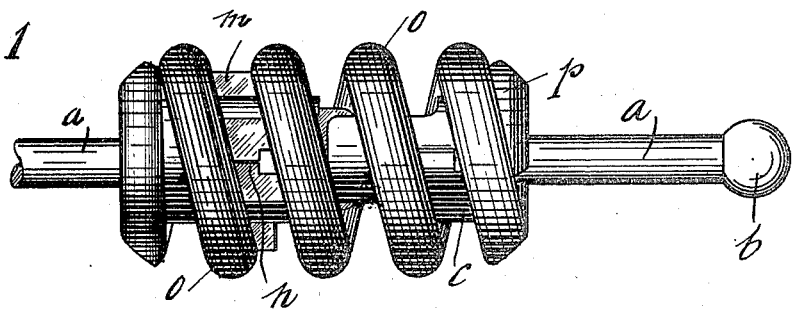
Figure 1 is an elevation of a chain link constructed in the preferred manner.
Figure 2:
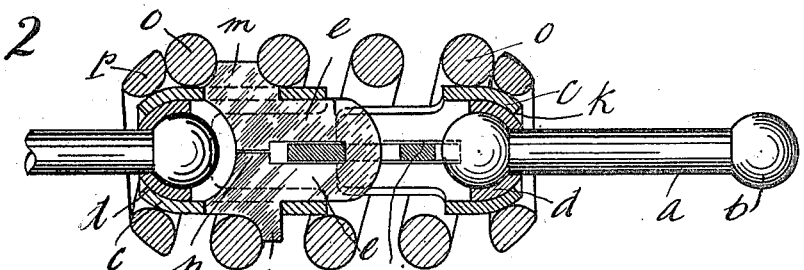
Fig. 2 is a vertical section thereof.

The links constructed in this way may be inclosed in rings or washers or sleeves of rubber or other flexible material, but preferably a helical spring $o$ is used for each link and the link members above described are threaded into the end of the spring and the projecting parts of the yoke members or bridge pieces $e$ which engage the lugs of the cupped end parts may have the further projections referred to as $m$ which are not opposite, but disposed with respect to each other at an inclination to suit the pitch of the helix, so that they may engage between the turns of the helix Figs. 1 and 2, thus bearing upon the said helical spring which may be of round, oval, or flat metal.

By means of these projections $m$ the spring if desired, may be keyed or locked against unthreading off the link by forming notches in the sides of the helical turns of the spring into which the projections engage.

Any other methods of anchoring the spring against unwinding off the link members may be followed, the preferred way being to close in the end turns of the spring as shown at $p$ Figs. 1 and 2.

The end coils of the springs that wind first over the link members need not necessarily be tempered so that they may be more readily bent back, as stated above to anchor the spring and to give a shape conforming better with the curves of any toothed driving or driven members engaging the chain. I find a more convenient way of accomplishing this and smoothing the end of the spring and closing tight against the next turn so that no projection at the end is left, is to press the ends of the spring against a rapidly rotating grinding disk or concave shape. The heat of the grinding appears to anneal the part required without affecting the temper of the other parts, and the end of the spring can by this means be bent in and smoothed off as desired.

When the yoke members or bridge pieces $e$ are disposed so that their concave portions are not in contact with each other when the spring $o$ is in position, any tension put on the link members draws the yoke parts toward each other and increases the distance of their projections $m$ engaging the turns of the spring so that the turns of the latter between the projections are distended giving a yielding drive to the chain so that it resembles an extensible belt drive. If the projections $m$ are not used the pull on the spring comes on the contact surfaces of the cup members $c$ with the spring.

Figure 9:
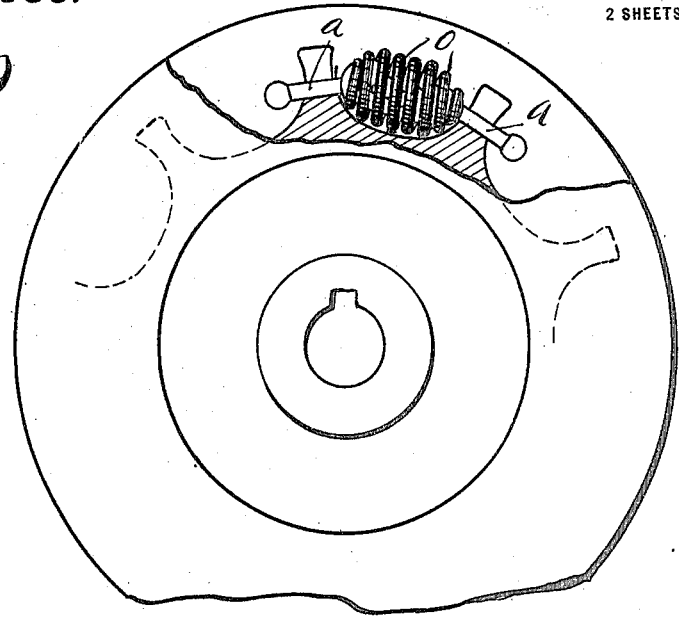
Fig. 9 is a part sectional elevation of a suitable form of pulley or sprocket for the chain.
Figure 10:
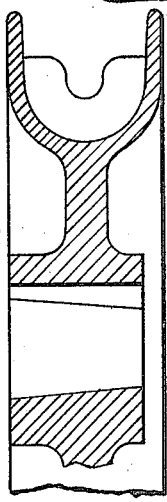
Fig. 10 is a section thereof.

At Figs. 9 and 10 I have illustrated a convenient form of shrouded sprocket of a similar construction to that described in my prior United States Patent No. 1,223,652. This is suitable for the chain here described, but any other suitable arrangement for the purpose may be employed.

Whether used for driving purposes or for handling as in operating a starter for an electric motor of a lift or for any like use, the outer contour of the chain is cylindrical and smooth. It is suitable to engage a grooved pulley and to establish frictional engagement with it. It is extremely flexible and adapted to be driven by a pulley or sprocket even of small diameter such as in motor cycle driving mechanism, and in its preferred form possesses a resiliency which is of great advantage in any use in which power transmitting mechanism is exposed to sudden shocks or loads.

It will be understood that helical springs $o$ covering the link members may be themselves inclosed or covered with any suitable material if desired, for giving a better frictional surface and for preventing noise in driving.

Although I have spoken of the springs as in tension between the link members, it will be obvious that as the latter are preferably staggered the projections engaging the spring may be disposed in parts that pass or cross each other so that the springs may be in compression as the members are extended.

Figure 11:
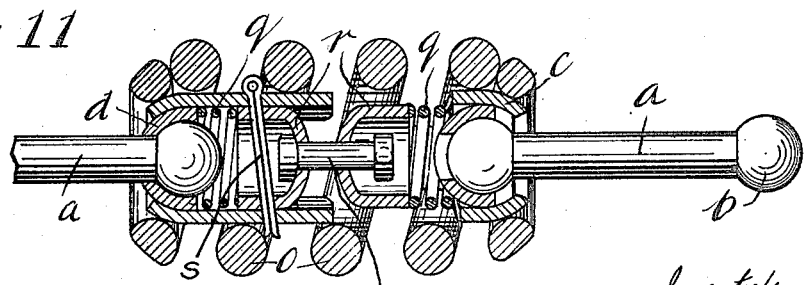
Fig. 11 is a sectional view of one form of connecting link.

At Fig. 11 I have shown the method that may be employed for connecting up portions or ends of a chain. The liners $d$ in this case instead of being merely slitted to the central aperture are cut out for the width of the aperture to the periphery and a small spring $q$ is inserted behind each to hold it in place under normal conditions, as shown at the left hand side of Fig. 11. Two oppositely disposed dished members $r$ are inserted in the cup members $c$ and are secured by split pins $s$ through the lugs of the cup members. The dished parts $r$ are connected by a solid double ended connecting link $t$.

When desired to connect up two portions of chain one of these special links may be employed, and the pins *s* are removed and each liner in turn is rotated and inverted, as shown at the right of Fig. 11, and the ball head of a shank link is inserted through the cup member, and the liner turned so that its cut out portion passes over the shank behind the ball and is retained by the spring *q* and the split pin *s* is again inserted, and the connection is complete.

I claim:—

1. In a claim made up with alternate links of shank like character the combination of said shank links, separate means for engaging the ends of adjacent shank links, and jointed means connecting such separate means.

2. In a chain made up with alternate links of shank like character, the combination of said shank links with separate means for engaging the ends of adjacent shank links and jointed means connecting such separate means; said shank links having enlarged ends, and said separate means each comprising a cup like member with projecting lugs therefrom and said jointed means engaging the lugs of two of said cup members.

3. In a chain made up with alternate links of shank like character, the combination of said shank links with separate means for engaging the ends of adjacent shank links and jointed means connecting such separate means: said shank links having enlarged ends, and said separate means each comprising a cup like member with projecting lugs therefrom, each pair of cup like members arranged with their projections directed toward each other but so that the lugs of one are opposite the gaps of another, said projecting lugs having openings therein and jointed connecting means engaging the openings of the lugs of each pair of cup members, said jointed means each comprising two connected yoke pieces.

4. In a chain made up with alternate links of shank like character, the combination of said shank links with links comprising separate means for engaging the ends of adjacent shank links, and jointed means connecting such separate means, in a manner permitting limited extension thereof, and springs inclosing said second links, each spring engaged at each end by said separate means so that an extension of said second links extends said springs.

5. In a chain made up with alternate links of shank like character, the combination of said shank links, and links comprising separate means for engaging the ends of adjacent shank links and jointed means connecting such separate means, said shank links having enlarged ends and said separate means being cup like members with projecting lugs, said jointed means engaging and connecting the lugs of said cup members; and springs inclosing said second links, each spring engaged at each end by said cup members so that an extension of said second links extends said springs.

6. In a chain made up with alternate links of shank like character, the combination of said shank links, and links comprising separate means for engaging the ends of adjacent shank links and jointed means connecting such separate means, said shank links having enlarged ends and said separate means being cup like members with projecting lugs, said jointed means engaging and connecting the lugs of said cup members; and springs inclosing said second links, each spring engaged at each end by said cup members so that an extension of said second links extends said springs, and the ends of said springs being rounded off substantially as described.

7. In a chain made up with alternate links of shank like character, the combination of said shank links having enlarged ends and links comprising separate cup like members for engaging the ends of said shank links, and jointed means for connecting said cup members; the said cup members having apertures to pass the enlarged ends of said shank links and split liners inserted behind said enlarged ends and within said cup members so that the pull of the shank links is transmitted to said cup members by said liners.

8. In a chain made up with alternate links of shank like character, the combination of said shank links with separate means for engaging the ends of adjacent shank links and jointed means connecting such separate means; said shank links having enlarged ends, and said separate means each comprising a cup like member with projecting lugs therefrom, each pair of cup like members arranged with their projections directed toward each other but so that the lugs of one are opposite the gaps of another, said projecting lugs having openings therein and jointed connected means engaging the openings of the lugs of each pair of cup members, said jointed means each comprising two connected yoke pieces, said yoke pieces being connected one across the other and each having internal projecting abutments which meet and form stiffening means.

9. In a chain made up with alternate links of shank like character, the combination of said shank links with links comprising separate means for engaging the ends of adjacent shank links, and jointed means connecting such separate means, the shank links having enlarged ends and the separate means, cup like ends with slotted projecting lugs, and said jointed connecting means comprising connected yoke pieces having projections engaging said slotted projecting lugs.

10. In a chain made up with alternate links of shank like character, the combination of said shank links with links comprising separate means for engaging the ends of adjacent shank links and jointed means connecting such separate means, and springs inclosing said links which alternate with the shank links; the shank links having enlarged ends and the separate means, cup like ends with slotted projecting lugs, and said jointed connecting means comprising connected yoke pieces having projections engaging said slotted lugs, and said jointed connecting means further having projections which engage said springs.

In testimony whereof I affix my signature.

LUIS WIRTZ.